United States Patent Office 3,149,374
Patented Sept. 22, 1964

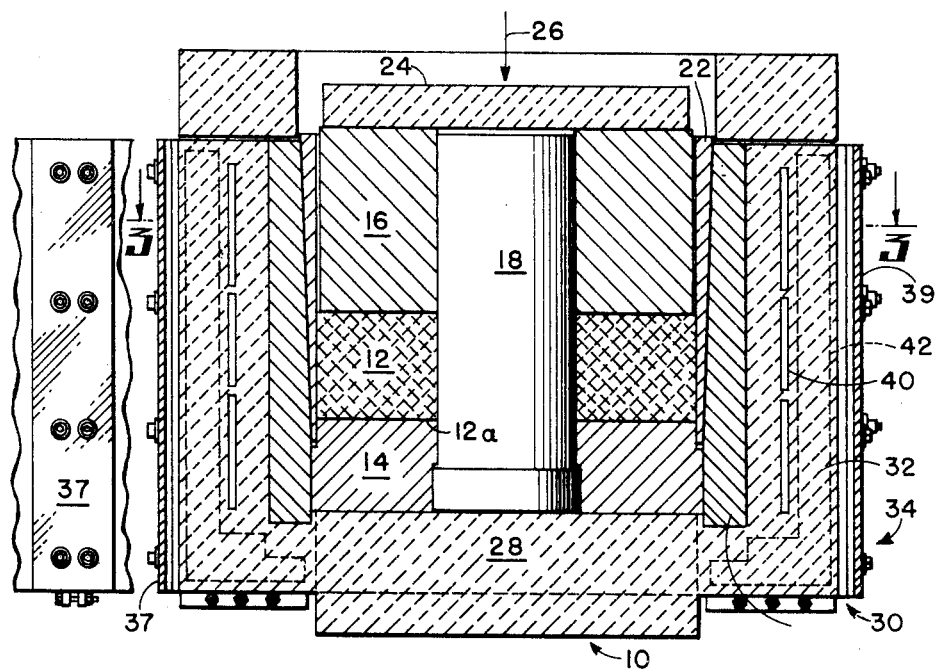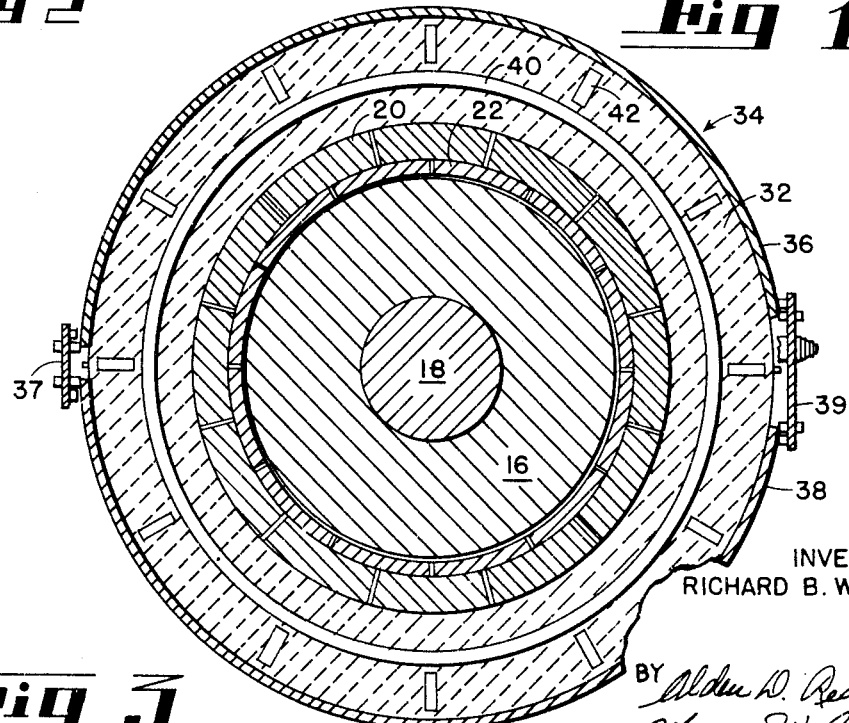

1

3,149,374
HOT PRESSING DIE
Richard B. Wagner, Westport, Conn., assignor to Avco Corporation, Stratford, Conn., a corporation of Delaware
Filed Apr. 6, 1962, Ser. No. 185,747
2 Claims. (Cl. 18—16)

This invention relates to a hot pressing die for forming ceramic and other materials where relatively large parts are formed at high values of heat and pressure.

A means to provide a hot pressing die for the simultaneous application of heat and pressure to form ceramic materials to a relatively large size in the range of approximately 3 feet in diameter, or greater, and requiring pressure in the range of 4,000 lbs. p.s.i., is a problem requiring special consideration, in view of the large size and the requirement for heat and pressure of such magnitude. Such a project lends itself to the use of electrical induction or resistance heating, and a die lining of graphite, or material of similar properties, for at least the portion of the die adjacent the work piece. The use of an all-graphite unit capable of holding the pressures would, however, require a unit of objectionable size and would incur great difficulty in holding the die together with the pressures required. Nor would the use of a steel band around a graphite core of large size be in itself a solution to the problem, as graphite units of sufficient size are not available and other problems, such as heating of the steel band, would not be solved.

The present invention provides a die for the hot pressing of a ceramic article of relatively large size, in the range of 3 feet in diameter or greater, using central die portion made up of graphite material of a size available in commerce. However, primary reliance is not placed on the graphite to provide the hoop stress for containing the material during forming process at a high temperature and pressure, the hoop stress for retaining the central graphite core during the hot temperature and high pressure forming being provided in major portion by an outer steel band substantially spaced from the outside of the graphite core with insulation with compressive strength between the graphite core and the steel band provided by a castable refractory material. This refractory material has cast therein an electrical induction heating coil, with metallic shunt also cast in the refractory between the heating coil and the outer steel band, the outer steel band being preferably provided with insulation between arcuate sections thus not to complete an electrical circuit circumferentially of the unit. The metallic shunt is positioned in the refractory between the induction heating coils and the steel band. The combination results in an assembly with sufficient operating central heat and pressure satisfactorily retained by a steel band which is not heated to destructive temperatures and thereby retains its tensile strength properties. The entire unit is thus retained in satisfactory condition for completing the hot pressing of the large work piece with a graphite central core of practical size.

The primary object of the invention, therefore is to provide a combination of central graphite die of practical diameter with adjacent surrounding refractory or other suitable insulating material with an embedded electrical induction heating element, the entire unit being surrounded by a stainless steel band to hold the assembly together under required pressures and with a metallic shunt also carried in the insulating material between an induction heating coil and the outer steel band, designed with special consideration for controlling the temperature of the steel band to assure that the steel band will not be excessively heated by the induction coil, the shunt deflecting the lines of force in such a way as to avoid excessive induction heating of the steel band.

It is further the object to provide a steel banded combination of heating and pressing die with surrounding insulating material, with embedded induction coil and including a shunt arrangement such as to make use of the steel band for retaining the unit to withstand the pressure but without excessive heating of such steel band.

The above and other objects of the invention will be apparent from the following more detailed description and by reference to the accompanying drawings forming a part hereof, and wherein:

FIG. 1 is a vertical cross section through a hot pressing die of the type employing this invention;

FIG. 2 is a view of the joint connecting the two halves of the steel band retaining the die assembly;

FIG. 3 is a cross section taken on line 3—3 of FIG. 1;

Figure 4:
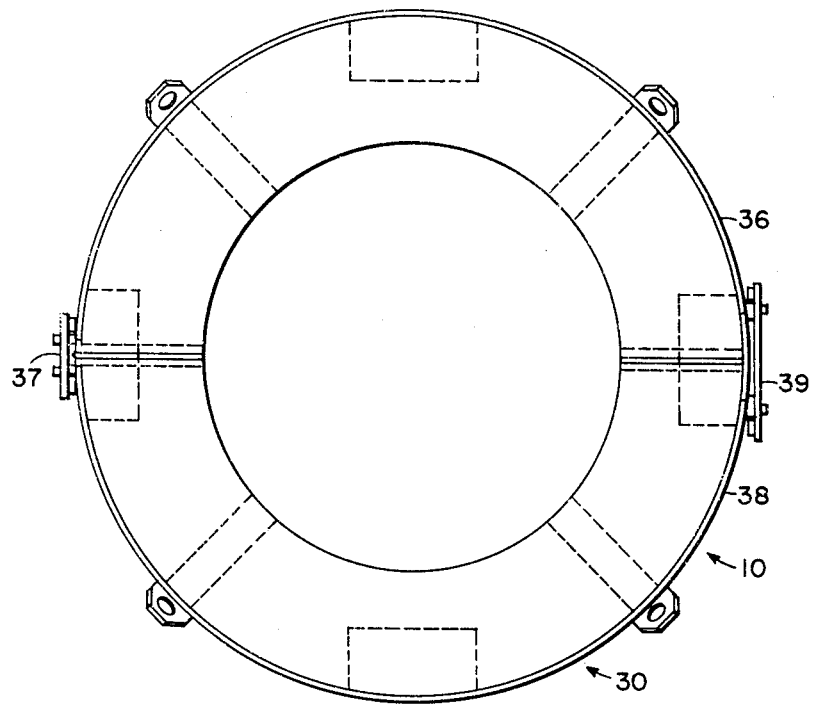
FIG. 4 is a schematic plan view of the hot pressing die.
Figure 5:
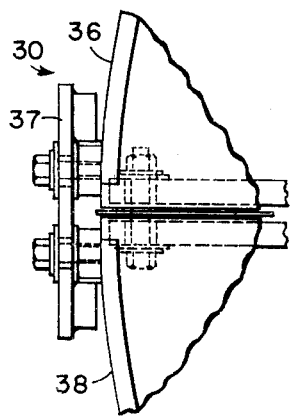
FIG. 5 is a top view showing the joint between the two halves of the steel band on one side of the die.
Figure 6:
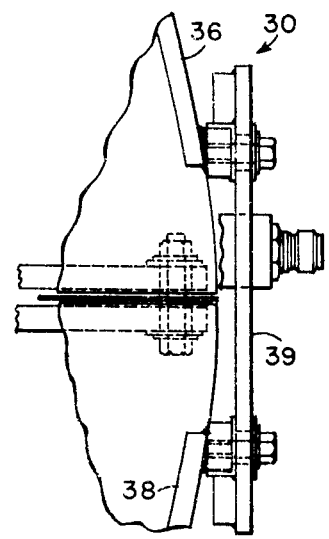
FIG. 6 is a joint between the two halves of the steel band on the opposite side of the die from that shown in FIG. 5.

Referring to the drawings and particularly to FIG. 1, there is shown a hot pressing die 10 of the type employing this invention. A workpiece 12, here shown as annular in form and of ceramic material, is located in a forming chamber 12a centrally of this die. This chamber 12a is lined and entirely surrounded by material capable of forming the chamber under high heat and pressure conditions, a material such as graphite having been found satisfactory for this purpose. The lining elements comprise a lower annular ring 14, an upper annular ring 16, a central cylinder rod 18, twelve centrifugally-spaced sleeve segments 20, twelve circumferentially spaced tapered sleeve segments 22, the sleeve segments 20 and 22 forming an annular lining which retains both the ceramic workpiece 12 and the annular rings 14 and 16. The annular ring 16 has a cylindrical upper pressure member 24 of insulating material capable of compressive stress, a castable refractory material being used in this illustration. The upper pressure member 24 is capable of withstanding pressure imposed from a press, not shown, in the direction of the arrow 26. This pressure is directed downwardly upon the graphite annular ring 16, this ring moving downward relative to the graphite rod 18 upon the ceramic workpiece 12. The lower ring 14 is supported upon a cylindrical pressure member 28, also preferably of refractory material. The aforesaid lined, preferably graphite-surrounded, chamber 12 with the aforementioned parts 14–22 inclusive, with their upper and lower pressure chambers 24 and 28 form the work chamber 12a and afford means to impose pressure upon the workpiece 12 in the chamber 12a. When there is a great downward pressure on material in the work chamber, such material being usually of powder form, in the initial stages there will be a radial pressure generated against the sleeves 20–22 and such pressure must be retained by some means, inasmuch as material such as graphite, capable of operating under the high heat conditions here contemplated, will not in practical sizes be capable of withstanding the stress. This means to retain the radial pressure is an important part of this invention and is combined with induction heating units in an annular assembly unit 30, which is made up of suitable insulating material having a compressive strength sufficient to withstand the pressures expected and for the illustrated mechanism a castable refractory is used which is formed in an annular form of sufficient radial thickness to fill a space between the sleeve 20 and a stainless steel band 34 which is made up of two halves 36 and 38. This annular refractory has embedded therein induction coils 40 necessary for heating the entire unit. Iron shunt units 42 are also embedded in the refractory between the induction coil and the outer shell. Induction coils 40 induce lines of force which cause heating of the internal graphite and the workpiece unit, while the iron shunt units 42 concentrate the lines of force generated between the coils and the outer shell so that an excessive amount of heat in the refractory and outer shell is not generated. As shown in FIGS. 3 and 4, the shell or band 34 is made up of two half circular portions 36 and 38 which are connected thereby to insulated joints 37, 39 insulated in such manner that the two halves 36 and 38 of the stainless steel shell or band 34, because of the insulation, further minimize the heating effect of the induction units on the steel shell. The use of non-magnetic stainless steel in the shell is also advantageous in reducing the heating of the shell.

In operation, in order to hot press a ring or annular form of workpiece from a ceramic or metallic powder, the loose powder is placed in the cavity 12a bounded by the bottom annular member 14 and the rod 18, the upper annular ring 16 and the pressure members 24 and 28 are assembled and the pressure exerted with increasing the temperature induced by the induction coils 40. When the heat and pressure are applied the powder medium in the workpiece exerts a force radially outward. This force acts upon the graphite inserts 20 and 22 and upon the insulating material in the annular unit 32 as a compressive force, which is, however, transmitted into a hoop stress by means of the two-piece steel shell 34. The insulating action of the refractory material in the unit 32, together with the shunt 42, the use of stainless steel in the band or shell 34, the insulating of semi-circular halves 36, 38 of the band 34, assure that the steel band will be of sufficiently low temperature to maintain its retaining properties at the temperatures existing in the central portion of the die at the workpiece.

The structure of the hot pressing die, above described, solves several very troublesome problems which were evident in initial attempts to provide a hot pressing die for forming materials where the heat and pressure required are relatively high. The specific problem of the forming of a ceramic part of annular form of approximately 35 inches in diameter, of material which required pressures as high as 4000 p.s.i. and with a temperature of 2500 degrees Fahrenheit, indicated that a graphite material would be satisfactory for withstanding the heat and to induce suitable temperatures with an induction heating unit, but the maximum diameter of graphite units commercially available was found to be about 52 inches, and such graphite unit would not be capable of forming a part larger than 24 inches in diameter and at no more than 500 p.s.i. An all-graphite die to make a 24 inch part with a 52 inch diameter would have to be insulated and would be of tremendous size. It was therefore found that a central graphite die-forming chamber be made as above set forth. Further, an insulating refractory section surrounding the graphite would furnish properties sufficient for withstanding the compressive stress generated by the pressures on the material in the graphite die. An induction heating coil embedded in the refractory with a transformer iron shunt between the coil and a two-part stainless steel band completes the unit surrounding the graphite core and workpiece. The unit was thus insulated and capable of retaining the high stresses and did not heat the stainless steel ring because of the shunt and the insulating properties of the refractory. This combination made possible a die capable of forming the part desired in a unit of satisfactory performance.

The die, as above described, provides an outer steel shell or stress member, the purpose of which is to take up the radial pressure emanating from the pressing operation, and to act as a container allowing the material to be worked or hot pressed under a vacuum or protective atmosphere. Inside the stress member is a layer of refractory or insulating material, the purpose of which is to reduce the heat losses from the workpiece. The mechanical properties of this material must be such as to allow for a crushing strength in excess of the radial pressure originating from the workpiece. This insulating member may contain a source of heat such as a high frequency induction coil or a resistance heater. Inside the insulating layer is an annular layer or layers of the material or materials constituting the die proper. Depending upon the use of the die assembly, these materials may be of various nature.

The device allows the fabrication of pieces under pressures and temperatures limited only by the working temperature of the die lining materials (graphite in the above example) and does not demand a high tensile strength of high temperature materials such as ceramics, or of relatively low temperature materials such as steels and super alloys at high temperatures. In summary, the problem of requirement of high tensile stress, as a hoop stress at high temperatures in hot pressing, has been solved by transmitting this stress to a low temperature area where adequate materials are available. The die is self-contained and does not require auxiliary clamping or holding devices to keep the die assembly together.

Various modifications are intended within the scope of the following claims:

We claim:

1. A hot pressing die for ceramic and like materials requiring high values of heat and pressure;
    a substantially cylindrical unitary assembly comprising:
        a graphite die forming a pressing chamber positioned substantially centrally of said cylindrical unit;
        means to exert pressure for forming material in a central region of said graphite die and longitudinally of said cylindrical unitary assembly;
        an annular lining of refractory compression-resistant material having a central opening to receive said graphite die and said longitudinal pressure exerting means;
        induction heating coils imbedded in said refractory material in substantially annular formation around said central graphite die region but radially outward therefrom;
        a steel band forming the outside peripheral covering of said cylindrical unit and surrounding and retaining said refractory material, said induction coil, and said graphite die;
        metallic shunt elements also imbedded in said refractory material but spaced annularly around in said refractory material radially outward from said induction coils between said induction coils and said steel band;
        said graphite, refractory, induction coils and metallic shunt being constructed and arranged as aforesaid so that tensile strength of said steel band, necessary at high values of heat and pressure experienced during hot pressing operations, is retained by the combined effect of said metallic shunt and said refractory material radially located between said coils and said steel band coacting to prevent reduction in tensile strength of said steel band by excess heating of said steel band.

2. A hot pressing die for ceramic and like materials requiring high values of heat and pressure;
    a substantially cylindrical unitary assembly comprising:
        a central die forming a pressing chamber positioned substantially centrally of said cylindrical unit;
        means to exert pressure for forming material in a central region of said die and longitudinally of said cylindrical unitary assembly;
        refractory compression-resistant material in an annular form surrounding said die and said longitudinal pressure exerting means;

induction heating coils imbedded in said refractory material in substantially annular formation around said central die but radially outward therefrom;
a steel band forming the outside peripheral covering of said cylindrical unit and surrounding and retaining said refractory material, said induction coil, and said central die;
metallic shunt elements also imbedded in said refractory material but spaced annularly around in said refractory material radially outward from said induction coils between said induction coils and said steel band;
said central die, refractory, induction coils and metallic shunt being constructed and arranged as aforesaid so that tensile strength of said steel band, necessary at high values of heat and pressure experienced during hot pressing operations, is retained by the combined effect of said metallic shunt and said refractory material radially located between said coils and said steel band co-acting to prevent reduction in tensile strength of said steel band by excess heating of said steel band.

References Cited in the file of this patent

UNITED STATES PATENTS

| | | |
|---|---|---|
| 1,823,180 | White et al. | Sept. 15, 1931 |
| 2,167,544 | De Bats et al. | July 25, 1939 |
| 2,195,297 | Engle | Mar. 26, 1940 |
| 2,317,597 | Ford et al. | Apr. 27, 1943 |
| 2,705,851 | Duerr | Apr. 12, 1955 |

FOREIGN PATENTS

| | | |
|---|---|---|
| 779,129 | Great Britain | July 17, 1957 |